United States Patent [19]

Atkin et al.

[11] Patent Number: 5,033,537

[45] Date of Patent: Jul. 23, 1991

[54] HEAT EXCHANGER WITH FLOW PASSAGES WHICH DEFORM IN OPERATION TOWARDS EQUALIZATION

[75] Inventors: Howard S. Atkin, Harrogate; Christopher J. Palmer, Leeds, both of England

[73] Assignee: Advance Design & Manufacture Limited, Bradford, Great Britain

[21] Appl. No.: 421,276

[22] Filed: Oct. 13, 1989

[30] Foreign Application Priority Data

Oct. 13, 1988 [GB] United Kingdom ................ 8824052

[51] Int. Cl.$^5$ ........................... F28F 3/08; F24F 3/14
[52] U.S. Cl. ....................................... 165/32; 165/54; 165/166; 165/46; 165/905; 165/906
[58] Field of Search ................ 165/166, 54, 32, 46, 165/905, 906

[56] References Cited

U.S. PATENT DOCUMENTS

| | | | |
|---|---|---|---|
| 3,212,572 | 10/1965 | Otto | 165/166 |
| 3,814,172 | 6/1974 | Shore | 165/166 |
| 4,006,776 | 2/1977 | Pfouts et al. | 165/166 |
| 4,301,863 | 11/1981 | Bizzarro | 165/166 |
| 4,303,123 | 12/1981 | Skoog | 165/166 |
| 4,858,685 | 8/1989 | Szücs et al. | 165/166 |

FOREIGN PATENT DOCUMENTS

| | | |
|---|---|---|
| 0047073 | 3/1982 | European Pat. Off. |
| 0167993 | 1/1986 | European Pat. Off. |
| 0208042 | 1/1987 | European Pat. Off. |
| 2611399 | 9/1977 | Fed. Rep. of Germany ...... 165/166 |
| 0003512 | 1/1980 | Japan ................................. 165/166 |
| 0233691 | 10/1987 | Japan ................................. 165/166 |
| 0267889 | 11/1988 | Japan ................................. 165/166 |
| WO80/00097 | 1/1980 | World Int. Prop. O. .......... 165/166 |

Primary Examiner—John K. Ford
Attorney, Agent, or Firm—Merchant & Gould, Edell, Welter & Schmidt

[57] ABSTRACT

There is disclosed an air conditioning unit for location in the wall of a room and which comprises a heat exchanger, an external supply fan operable to blow air into the room through the heat exchanger and an extract fan operable to draw air out of the room through the heat exchanger, in which the heat exchanger comprises a stack of thin flexible plates which are spaced apart from each other so as to define between opposed faces of adjacent plates extract air flow paths and supply air flow paths through the heat exchanger, with the spacing apart of the faces defining the extract air flow paths being greater than the spacing apart of the faces defining the supply air flow paths whereby the depth of the extract air flow paths initially is greater than the depth of the supply air flow paths, but during operation any tendency for the flexible plates to deform under differential pressure action results in the depths of the extract air flow paths and supply air flow paths being substantially equalized, which provides more efficient heat transfer between the air flow paths.

8 Claims, 7 Drawing Sheets

HEAT EXCHANGER WITH FLOW PASSAGES WHICH DEFORM IN OPERATION TOWARDS EQUALIZATION

FIELD OF THE INVENTION

The prensent invention relates to an improved heat exchanger of the type which comprises a stack of thin parallel plates, and particularly, though not exclusively, to such a heat exchanger intended to be incorporated in an air conditioning unit for supplying fresh air into and extracting stale air from an otherwise closed room, with heat exchange occurring between the incoming (supply) and outgoing (extract) air streams.

BACKGROUND TO INVENTION

Air conditioning units of this type generally comprise two separate fans, namely a supply fan (blowing fan) and an extract fan (suction fan), and a heat exchanger through which the supply and extract air streams pass, generally in counterflow or cross flow fashion. Conventionally, heat exchangers for use in such air conditioning units comprise a stack of thin plates of metal such as aluminum or copper. Such heat exchangers have minimum resistance to air flow, thus allowing the size of the supply and extract fans, and thus the operating noise level, to be kept to a minimum. However, metal plate heat exchangers are heavy, expensive to manufacture, and the metal (especially aluminiun) can be damaged by corrosive environments such as swimming pools.

One approach to this problem has been to use very thin plastic plates which are light, cheap to manufacture, and still offer very good heat transfer, these plates generally being heavily ribbed to increase the total surface area available for heat exchange. The plastic plates, which may be made from "nylon", PVC or any other suitable plastics material, are also advantageous in that they are resistant to corrosion.

The use of plastic plates has forever created another problem. Because the plates are very thin they tend to flex easily, particularly about axes which are parallel to the ribs. When the plates are stacked together to form a heat exchanger, the plates define a plurality of supply flow paths an extract flow paths which are each made of narrow depth in order to maximise heat recovery i.e. only small spacing apart of the plates in the stack. The narrow flow paths and the flexibility of the plates (together with the differential pressure action of the supply and extraction fans) combine to result in the plate wall faces defining the supply flow path being blown wider apart and the faces defining the extract flow paths being drawn closer together during operation of the unit. This is thought to be due to the pressure differential between the supply and extract fans, and results in reduced extract flow rate and hence lower temperature efficiency. Usually, the supply and extract fans are both located on the outside of the heat exchanger, and one fan operates to blow air into the heat exchanger whilst the other fan operates to draw air from the heat exchanger. An attempt has been made to overcome the problem of the deformation of the flow paths, by placing the supply and extract fans one on either side of the heat exchanger. The supply and extract pressure are then much more balanced, since the two fans are each blowing air into the heat exchanger. However, this arrangement increases the total length of the unit which is unacceptable when the unit is designed to be installed in a wall, and also the location of a fan on the room side of the heat exchanger increases the operating noise level.

An alternative approach is to use a more powerful extract fan to overcome the resistance to flow produced by the narrowing of the extract flow paths. This approach is not acceptable as such an arangement would have a high noise level and higher power consumption, and in addition the stronger extract fan can cause the distortion of the flow paths to increase, thus exacerbating the problem.

It is therefore the aim of the present invention to provide an improved heat exchanger which overcomes the above-mentioned disadvantages.

SUMMARY OF THE INVENTION

According to a first aspect of the present invention there is provided a heat exchanger for use in an air conditioning unit and which comprises a stack of thin flexible plates which are spaced apart from each other so as to define between opposed faces of adjacent plates first and second air flow paths through the heat exchanger, in which the spacing apart of the faces defining the first air flow paths is greater than the spacing apart of the faces defining the second air flow paths whereby the depth of the first air flow paths is greater than the depths of the second air flow paths.

According to a second aspect of the present invention there is provided an air conditioning unit for location in the wall of a room, and which comprises a heat exchanger and, mounted exteriorly of said heat exchanger, a supply fan operable to blow air into the room through the heat exchanger and an extract fan operable to draw air out of the room through the heat exchanger, in which the heat exchanger comprising a stack of thin flexible plates which are spaced apart from each other so as to define between opposed faces of adjacent plates alternate supply and extract air flow paths through which air is moved by said fans, the spacing apart of the faces defining the extract air flow paths being greater than the spacing apart of the faces defining the supply air flow paths whereby the depth of the extract air flow paths is greater than the depth of the supply air flow paths.

By utilising extract air flow paths which are deeper than the supply air flow path, the effects of plate distortion is minimized.

Preferably, the difference in the depth of the extract and supply flow paths is at least 1 mm.

The depth of the air flow paths would typically be, for an industrial unit, 5 mm for the supply paths and 6 mm for the extract paths, or, for a domestic unit, 3 mm for the supply paths and 4 mm for the extract paths.

Because an allowance is made for plate distortion, the extract flow rate is not significantly reduced, and the temperature transfer efficiency increases.

Preferably, the supply and extract fans are both axial flow fans. This type of fan is thinner and thus does not take up too much room in the unit, but does not operate against significant resistance to air flow. Thus, the reduced resistance to extract flow means that the axial flow fans are feasible.

Conveniently, the plates themselves are approximately 150 microns thick, but it should be appreciated that the reduced effects of plate distortion means that even thinner plates may be used to improve heat transfer and reduce the weight and manufacturing cost of the unit.

Preferably, the plates are made from plastics material such as PVC, "nylon" or similar and the edges of each pair of adjacent plates may be joined together over at least a part of their perimeter.

Conveniently, the plates each include a plurality of ribs running continuously and/or discontinuously across the plate.

DESCRIPTION OF PREFERRED EMBODIMENTS

Figure 1:
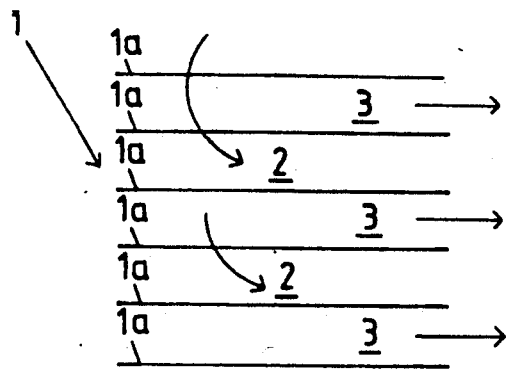
FIG. 1 is a cross section through a conventional heat exchanger.
Figure 2:
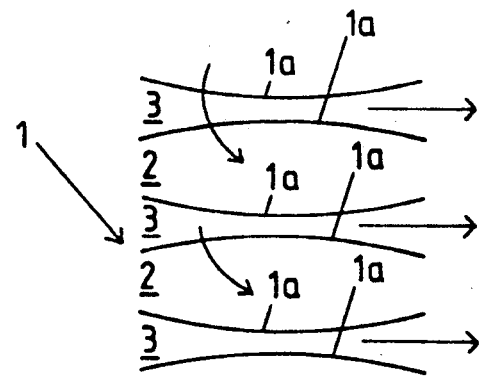
FIG. 2 is a cross section through the heat exchanger of FIG. 1, in use.
Figure 3:
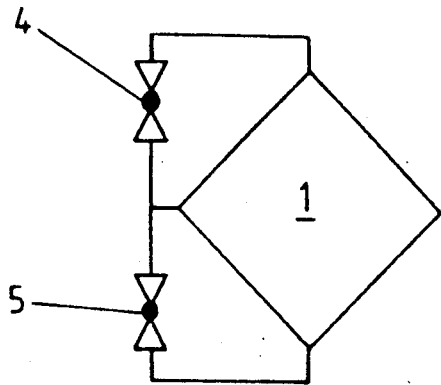
FIG. 3 is a schematic of a conventional air conditioning unit using the heat exchanger of FIGS. 1 and 2.

Referring to the drawings, FIGS. 1 and 2 illustrate the problem of plate deformation in a conventional heat exchanger comprising a stack of thin flexible plastic plates 1a. These plates define between opposed faces of adjacent plates alternate supply 2 and extract 3 air flow paths through which air is blown by supply fan 4 and drawn by extract fan 5 as shown in FIG. 3. Because fan 4 is blowing air through the heat exchanger whilst fan 5 is sucking air into the heat exchanger, there is a pressure difference between flow paths 2 and 3 which causes the plates to bend as shown in FIG. 2, thus restricting the extract flow paths 3 resulting in reduced temperature efficiency or thermal transfer.

Figure 4:
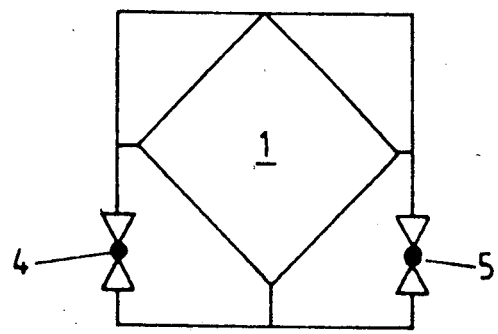
FIG. 4 is a schematic of an alternative conventional air conditioning unit.

FIG. 4 shows one approach to the problem which is to locate the supply fan 4 and extract fan 5 on opposite sides of the heat exchanger. This approach is not acceptable because of the increased length of the unit and also the noise level.

Figure 5:
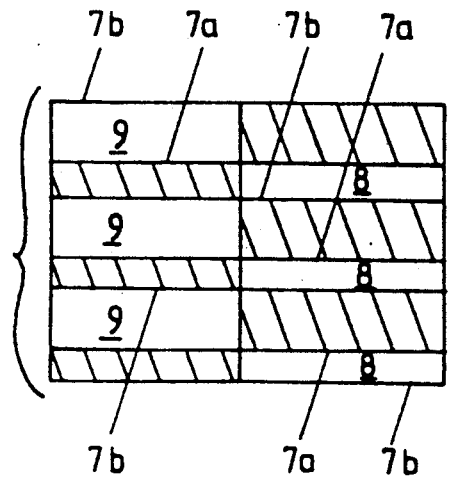
FIG. 5 is an end view of a heat exchanger in accordance with the present invention.
Figure 6:
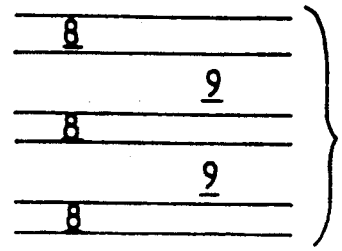
FIG. 6 is a cross section through the heat exchanger of FIG. 5.

As shown in FIGS. 5 and 6, a heat exchanger according to the present invention comprises a stack of thin flexible plastic plates 7 of which there are two types 7a and 7b stacked alternately. These plates define between them alternate supply 8 and extract 9 flow paths, and the spacing apart of the plates 7a, and 7b varies alternately so that the opposed faces which define paths 9 are further apart than the opposed face which defin paths 8. Therefore, the extract paths 9 are made wider than the supply paths 8 by approximately 1 mm.

Thus, when the fans 4 nd 5, which would typically be arranged as shown in FIG. 3, are operated, the plates still deform under the differential pressure action on each plate caused by positive pressure on one side and negative on the other. However, the resultant effect is that the depths of the two air flow paths 8 and 9 become approximately equal since the extract path 9 is initially deeper. Thus, there is no appreciable increase in resistance to extract flow along extract path 9 and thus the temperature efficiency of the heat exchanger is increased.

Figure 7:
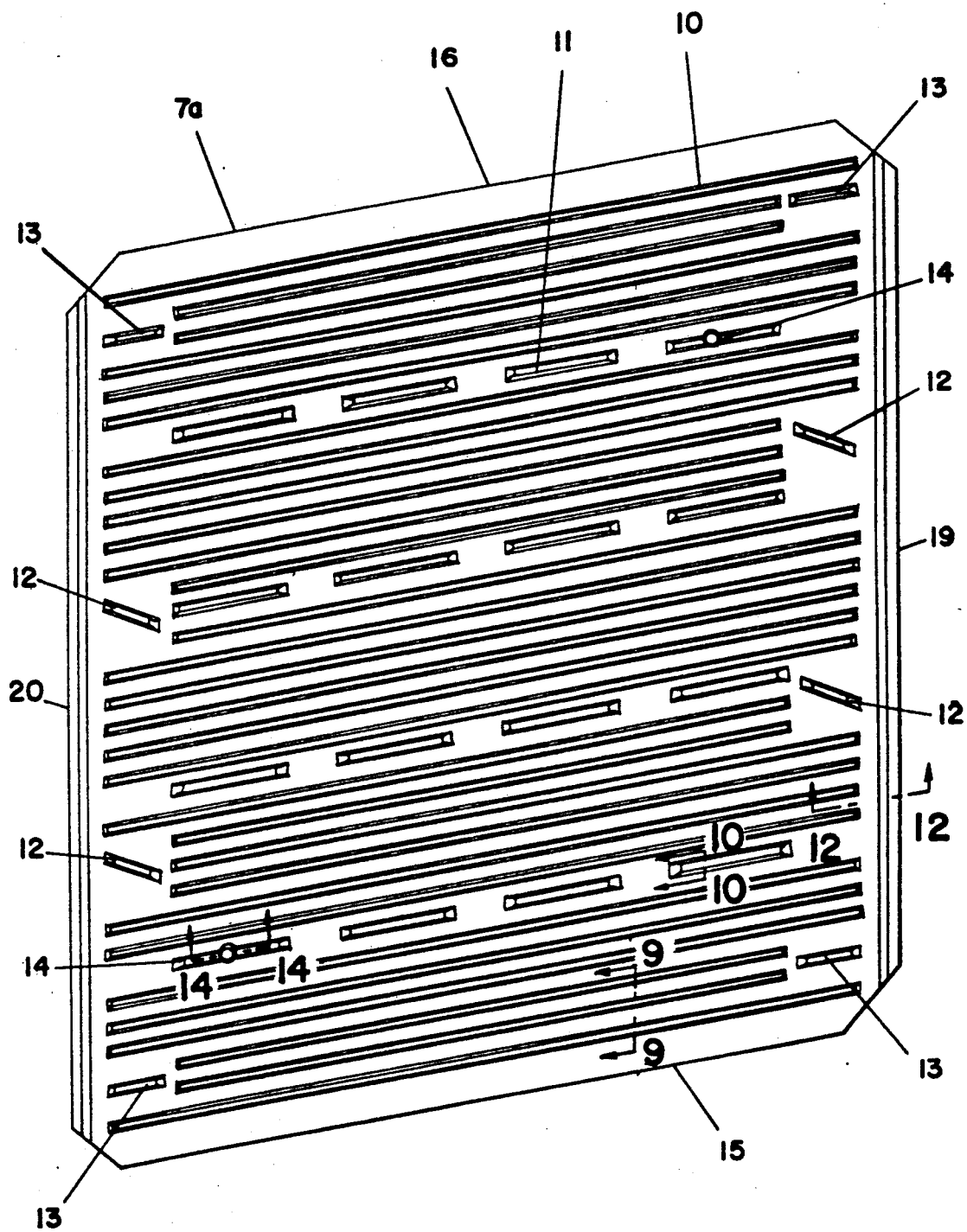
FIG. 7 is a plan view of a first type of plate forming part of the heat exchanger of the present invention.

As shown in FIG. 7, one type of plate 7a includes a plurality of ribs 10 runnig across the plate to provide a certain degree of stiffness. Further ribs 11 are also provided which are larger than ribs 10, to provide stiffness and also to separate the adjacent plates. The ribs 11 may be continuous, as in plate 7b in FIG. 8, or discontinuous as in FIG. 7. Ribs 12 provide support and plate separation at the flow entry and exit points, and ribs 13 provide support and plate separation at the corners.

Figure 8:
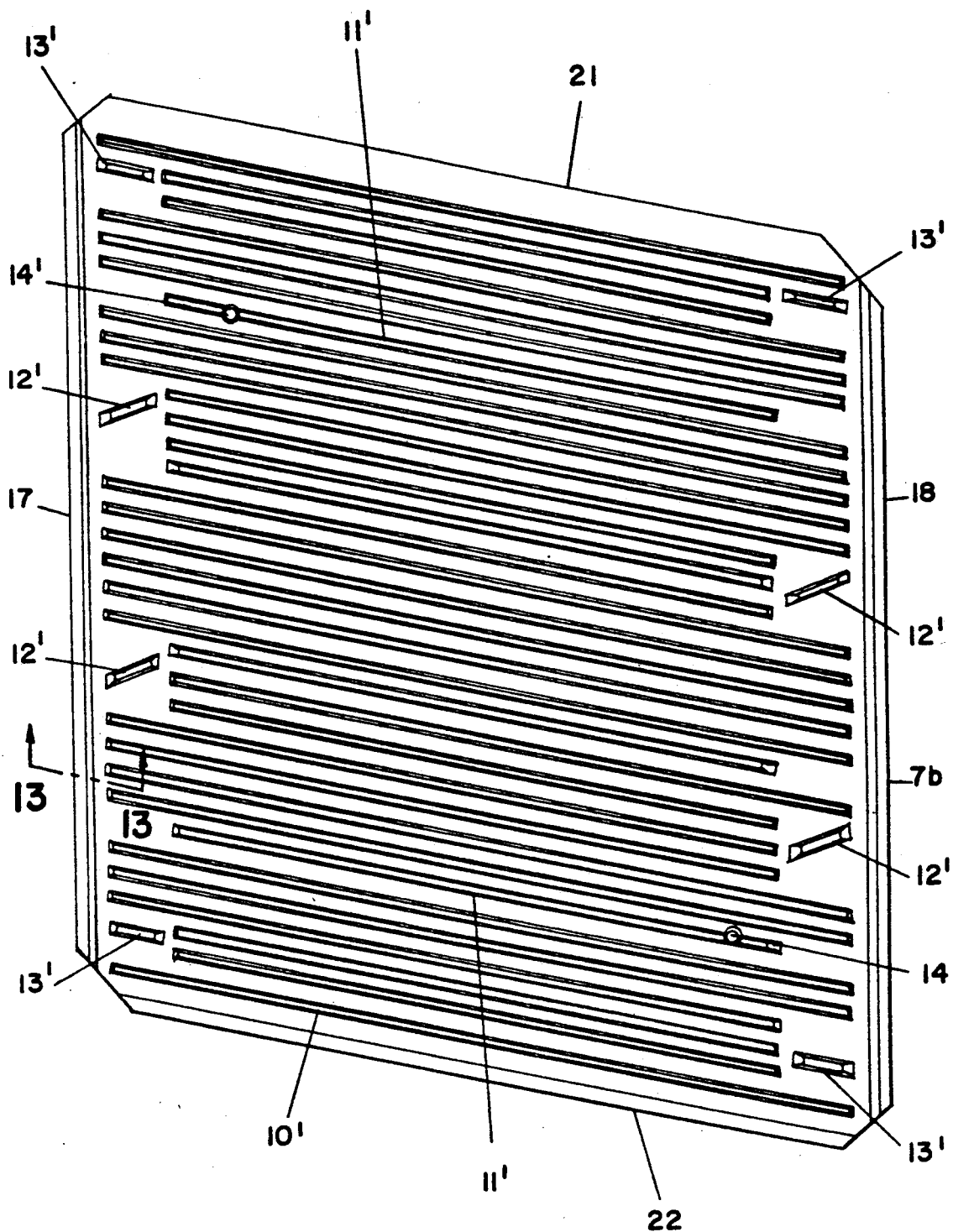
FIG. 8 is a plan view of a second type of plate forming part of the heat exchanger of the present invention.
Figure 9:
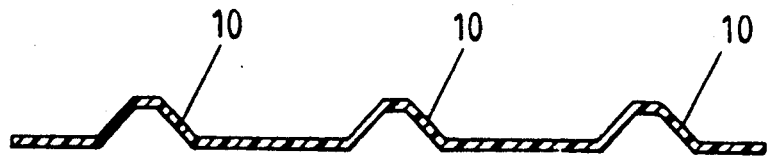
FIG. 9 is a section on line 9—9 of FIG. 7.
Figure 10:
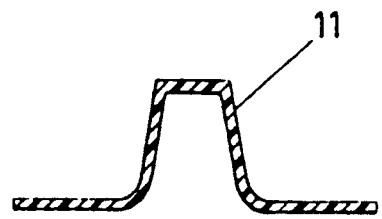
FIG. 10 is a section on line 10—10 of FIG. 7.
Figure 11:
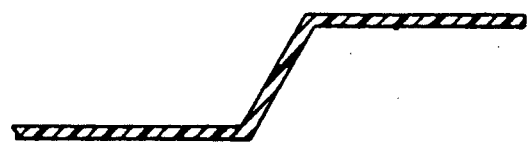
FIG. 11 is a section on line 11—11 of FIG. 10.
Figure 12:
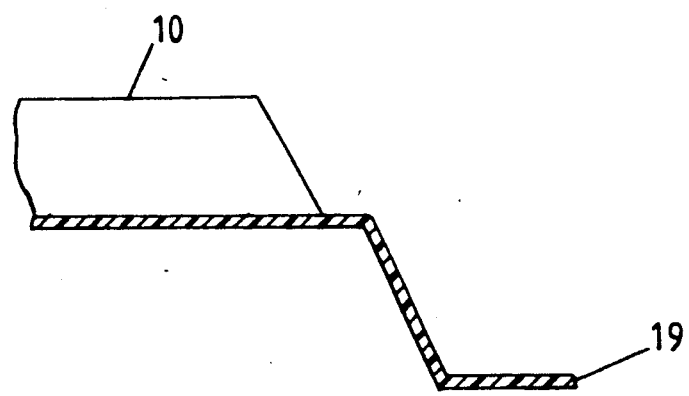
FIG. 12 is a section on line 12—12 of FIG. 7.
Figure 13:
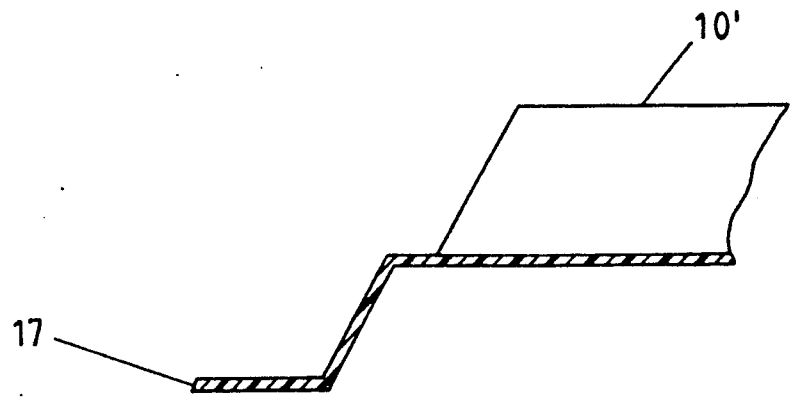
FIG. 13 is a section on line 13—13 of FIG. 8.
Figure 14:
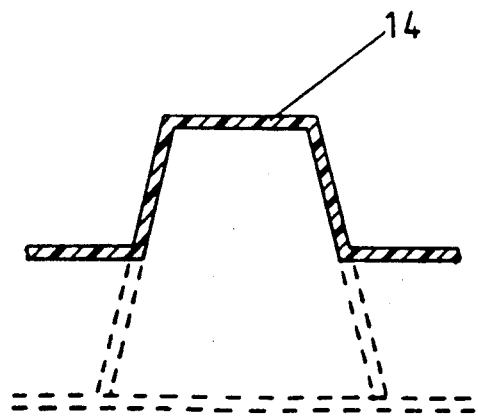
FIG. 14 is a section on line 14—14 of FIG. 7.

To enable large numbers of these plates 7a, 7b to be assembled one on top of the other, plate to plate location means 14 in the form of two small circular protrusions are provided on each plate, these nesting together to provide the necessary location for the stacked plates.

plate 7b illustrated in FIG. 8 is similar to plate 7a in that it is provided with similar ribs 10', 11', 12' and 13' and location means 14.

However, the ribs 10' and 11' run approximately perpendicular to the ribs 10 and 11 of plate 7a. By arranging for ribs 11' to be smaller than ribs 11 by approximately 1 mm, the extract flow path 9 can be made approximately 1 mm deeper than the supply flow path 8.

When plate 7a is stacked on top of plate 7b, edges 15 and 16 of plate 7a are enclosed within folded edges 17, 18 of plate 7b but edges 19, 20 of plate 7a are spaced from edges 21, 22 of plate 7b by ribs 11' to define supply flow path 8. Similarly, when a further plate 7b is stacked on top of plate 7a, edges 21, 22 of plate 7b are enclosed within folded edges 19, 20 of plate 7a but edges 17, 18 of plate 7b are spaced from edges 15, 16 of plate 7a by ribs 11 to define extract flow path 9. By stacking a number of plates 7a, 7b alternately one on top of the other the arrangement of FIG. 5 is achieved.

Figure 15A:
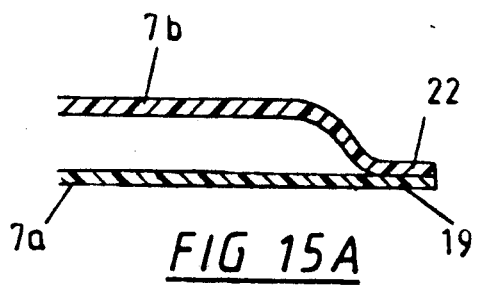
FIG. 15A illustrates one type of joint between two adjacent heat exchanger plates.
Figure 15B:
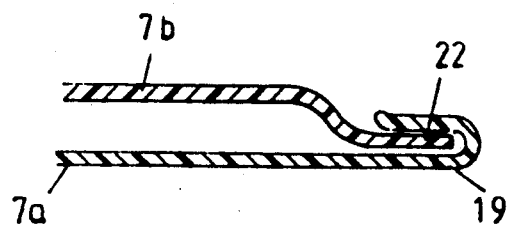
FIG. 15B illustrates an alternative type of joint between adjacent heat exchanger plates.

As shown in FIG. 15A, one type of joint between adjacent plates 7a, 7b is a simple butt joint in which the edges 22 and 19 are aligned. In FIG. 15B, the edge 22 is freely located, but not welded, within edge 19 which is bent back over the top of edge 22. This arrangement is much better than that shown in FIG. 15A because it provides a radius edge to give minimum air resistance and provide three layers at the edge for improved edge stiffness.

Figure 15C:
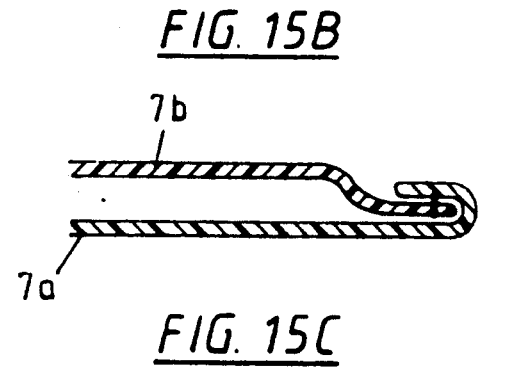
FIG. 15C illustrates a further alternative type of joint between adjacent heat exchanger plates.

FIG. 15C illustrates the most preferred form of joint in which the folded technique of FIG, 15B is used but the edges 19 and 22 are welded together, to provide a joint which is smooth, stiff and air tight.

Figure 17:
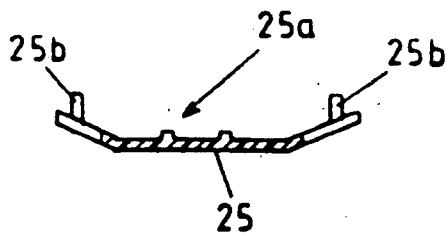
FIG. 17 is a section on 17—17 of FIG. 16.
Figure 16:
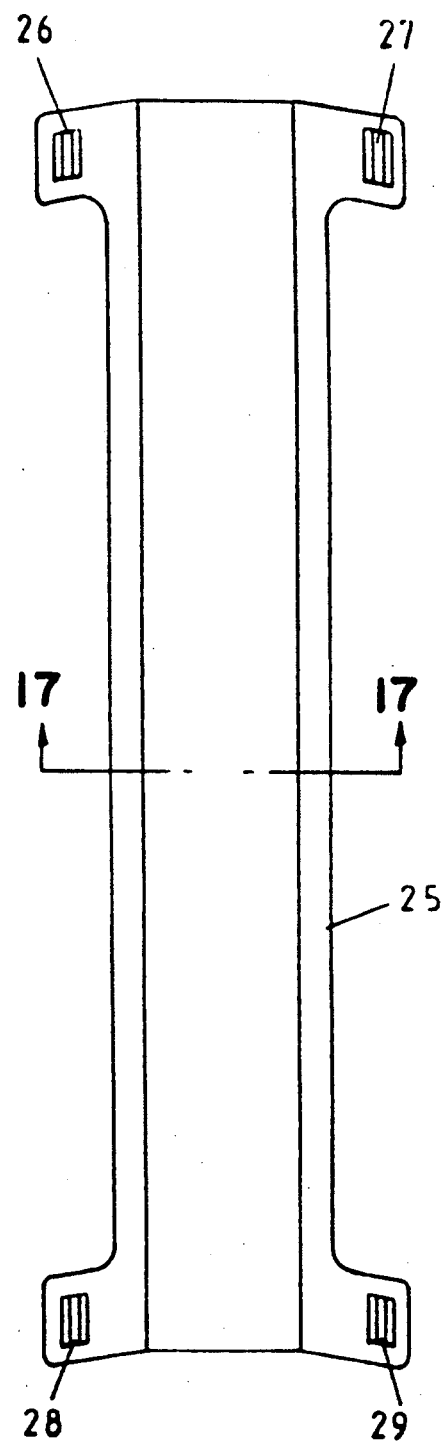
FIG. 16 is a plan view of a rigid former used to secure the plates in a stacked arrangement in the air conditioning unit.
Figure 18:
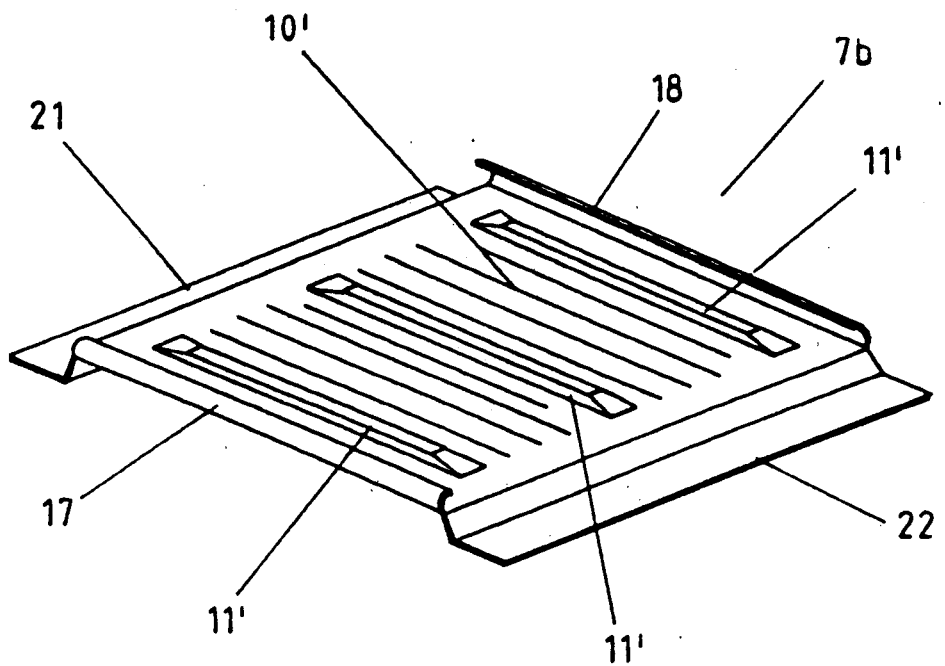
FIG. 18 is a perspective view of the plate shown in FIG. 8.

The edges of all the plates 7a, 7b are held together at each corner by a rigid plastics former 25 which is shown in FIGS. 16 and 17. The former has slots 26, 27, 28 and 29 which engage with protrusions on the top and bottom plates enclosing the stack of heat exchanger plates, and the inside of the former has a concavely curved section to provide a longitudinal rescess 25a bounded by longitudinal ribs 25b. During assembly, a polyurethane sealant or similar substance is extruded into the recess along the length of the former, and the edges of the heat exchanger plates are pressed into the sealant to form a stiff corner section.

We claim:

1. A heat exchanger for use in an air conditioning unit which comprises a stack of thin flexible plates which are spaced apart from each other so as to define between opposed faces of adjacent plates first and second air flow paths through the heat exchanger, in which the spacing apart of the faces defining the first air flow paths is greater than the spacing apart of the faces defining the second air flow paths whereby the depth of the first air flow paths is greater than the depth of the second air flow paths, and said spacing being such that when said air conditioning unit is operable to move air through the first and second air flow paths the flexible plates distort such that the depths of the first and second paths tend towards equalization.

2. An air conditioning unit for location in the wall of a room, and which comprises a heat exchanger and, mounted exteriorly of said heat exchanger, a supply fan operable to blow air into the room through the heat exchanger and an extract fan operable to draw air out of the room through heat exchanger, in which the heat exchanger comprises a stack of thin flexible plates which are spaced apart from each other so as to define between opposed faces of adjacent plates alternate supply and extract air flow paths through which air is moved by said fans, the spacing apart of the faces defining the extract air flow paths being greater than the spacing apart of the faces defining the supply air flow paths whereby the depths of the extract air flow paths is greater than the depth of the supply air flow paths, and said spacing being such that when said supply and extract fans are operable to move air through said supply and extract air flow paths the flexible plates distort such that the depths of the supply and extract paths tend towards equalization.

3. An air conditioning unit according to claim 2, in which the difference in the depth of the extract and supply flow paths is at least 1 mm.

4. An air conditioning unit according to claim 2, in which the plate are spaced apart at required spacings from each other by means of a plurality of ribs running continuously across the plates.

5. An air conditioning unit according to claim 2, in which the plates are made of plastics material and are approximately 150 microns thick.

6. A air conditioning unit according to claim 2, in which the edges of each pair of adjacent plates are joined together over at least a part of their perimeter.

7. An air conditioning unit according to claim 2, in which the supply and extract fans are each axial flow type fans.

8. An air conditioning unit according to claim 2, in which the plates are spaced apart at required spacings from each other by means of a plurality of ribs running discontinuously across the plates.

* * * * *

UNITED STATES PATENT AND TRADEMARK OFFICE
CERTIFICATE OF CORRECTION

PATENT NO.   : 5,033,537

DATED        : 23 July 1991

INVENTOR(S)  : Howard S. Atkin, Christopher J. Palmer

It is certified that error appears in the above-identified patent and that said Letters Patent is hereby corrected as shown below:

Column 1, line 8, delete "prensent" and insert --present--.

Column 1, line 40, delete "forever" and insert --however--.

Column 1, line 64, delete "pressure" and insert --pressures--.

Column 2, line 26 delete "depths" and insert --depth--.

Column 2, line 46, delete "path" and insert --paths--.

Column 4, line 37, delete "smaller" and insert --taller--.

Column 6, line 5, delete "depths" and insert --depth--.

Column 6, line 16, delete "plate" and insert --plates--.

Signed and Sealed this

Seventh Day of January, 1992

Attest:

HARRY F. MANBECK, JR.

*Attesting Officer*     *Commissioner of Patents and Trademarks*